Patented June 15, 1937

2,083,853

UNITED STATES PATENT OFFICE 2,083,853

PROCESS FOR TREATING SOYA BEANS AND LIKE LEGUMES

Alfred H. McComb, Homewood, Ill.

No Drawing. Application April 20, 1934, Serial No. 721,437

5 Claims. (Cl. 99—98)

This invention relates to improvements in the treatment of soya beans and/or other legumes or edible seeds, whereby the same may be converted from their original and undesirable distasteful state into a highly nutritive and pleasingly palatable food product for human consumption.

Whereas various methods and processes have been heretofore developed for the conversion and removal or partial removal of the natural oils and other substances of objectionable taste in legumes, particularly soya beans, in order to render the same pleasingly and tastily edible, insofar as I am aware, all thereof fall far short of attaining the sought for objective, to wit, a finished or treated soya bean possessing truly good taste and nut-like body consistency, as well as retaining its well recognized biological valuable proteins.

This invention has for its principal desiderata, the economical production of a truly tasteful soya bean or legume possessed of a nut-like flavor and body consistency; a product wherein the original oils and like matters will be effectually treated, preserved and prevented from becoming rancid; a processed soya bean from which all trace of the objectionable cereal flavor, so evident in those soya beans treated in accordance with prior methods, will be removed and supplanted by a remarkably true nut-like flavor; and, a finished soya bean of the same or substantially the same size as the raw bean, yet having a readily, though not too freely, masticatable consistency, hence permitting of its packaging without likelihood of subsequent crushing or crumbling by reason of harsh or repeated handling.

Others of the meritorious features of the invention will be in part obvious and in part pointed out hereinafter.

A typical example, by way of which my improved method of soya bean treatment may be carried into practice, is as follows:

A desired quantity of raw soya beans is thoroughly cleansed by washing them in cold or lukewarm water, which operation is effected in such a manner that the beans will be immersed for a comparatively short time. The now cleansed soya beans are immersed into a tank, vat, or the like, containing either cold or slightly heated water. They are permitted to remain immersed for a period of from one to two hours, or for a time sufficient to cause expanding of the bean cellular structures to degrees within the limits of their maximum expansibility and without destroying the inherent elasticity of such cellular structures depending upon the character of the beans being treated. During the period of immersion in the water, the soya beans will be partially soaked, i. e., the hulls or skins of the beans will be saturated and a superficial absorption of water will be effected by the bodies or the meats of the beans. It is important to particularly observe at this point, that whereas the soya bean skins will probably be well saturated by the aforesaid immersion, the bodies or meats of the beans will not be so affected; rather, but a limited amount of water will be taken up thereby, so that their albuminous content will not be injured.

The superficially water saturated or soaked soya beans will be enlarged, and by the same token, the cellular structures thereof will be dilated.

If desired, the soya beans at this particular stage of treatment may be dehulled. That is to say, when the water immersed soya beans have had their hulls or skins loosened through the soaking effect of the water, and thus, positively loosened, the water in the receptacle is well agitated, hence, causing the bean hulls or skins to separate from the bodies or meats thereof and arise to the surface of the water, whereupon they may be flowed off or otherwise removed.

Following the water treatment of the soya beans, they are then discharged and submerged into a kettle or vat containing an animal or vegetable oil heated to a temperature of from 350° F. to 375° F., this temperature being more or less evenly maintained over a period of from four to five minutes, or until such time as the submerged soya beans have contracted and returned to their original sizes. The greater portion of the water content of the superficially saturated soya beans, upon their being introduced into the highly heated kettle contained oil, will be positively forced into and through the now expanded cellular structures of the beans by the highly heated oil, and such water or moisture will be rapidly converted into steam within such expanded cellular structures. The resulting phenomena effects a positive changing of the natural oils and other substances of objectionable taste of the beans into a pleasing and palatable flavor. With the continued application of heat to the soya beans from the kettle contained oil, and because of the fact that the steam generated within the cellular structures cannot escape therefrom by way of an outward exiting by the heated oil, a number of the steam impregnated cells of the bean bodies or meats will be exploded, whereas in the others thereof, their steam content will be exhausted within the same. In either event, it will be understood that the conversion of the natural oils and other substances of objectionable taste of the beans into a pleasing and palatable flavor will be effected. Likewise, it is to be understood that because of the exploding of the steam filled cellular structures of the beans, a multiplicity of small pockets or closed cells will be formed therein, and hence, a degree of desired tooth resistance of the ultimately treated bean will be attained. Instantly following the exploding of the steam impregnated cells and the exhaustion of the steam in others of the bean bodies or meats, and due to the inherent elasticity of the cellular structures, the same will immediately contract. Consequently, the partially treated beans will be caused to return to their normal or substantially normal sizes. The outer portions of the cellular structures of the bean bodies or meats, and particularly, those portions of said cullular structures, which open into the outer surfaces of the beans, will be positively closed by said contraction, and therefore, they will be effectually sealed against the admission of any further appreciable quantities of the kettle contained oil.

The kettle contained oil now has its temperature decreased to from 250° F. to 275° F. This lower temperature is maintained for a period of from ten to fifteen minutes, or until such time as the soya beans submerged in the oil take on the desired color, preferably, a golden or brownish hue, whereupon the beans are removed from the kettle contained oil and allowed to dry.

The above described second stage of heated oil treatment of the soya beans, i. e., wherein the temperature of the oil is reduced, I have reason to believe, not only effects the desired coloring of the beans, but also causes the beans to be brought to a nut-like brittleness or body consistency. Furthermore, the said treatment definitely improves or perfects the nut-like flavor of the soya bean product. Also, the said second stage of heated oil treatment removes all traces of an objectionable cereal flavor from the soya beans, and additionally, it insures a complete or positive contraction of the previously expanded cellular structures of the beans, consequently, insuring the return of the beans to approximately their respective original sizes.

The contraction of the previously water dilated or expanded cellular structures of the soya beans, by reason of the above described first and second stages of heated oil treatment is of great importance in the production of a perfectly processed soya bean product. By reason of the first stage of oil treatment of the beans, the previously expanded cellular structures thereof will be positively contracted, and accordingly, the bodies or meats of the beans are given a consistency such as will prevent them from too freely crumbling or crushing. This is of particular importance in the subsequent handling and packaging of the products. Also, this first stage of oil treatment of the beans will positively contract or close the mouths or outer portions of the cellular structures of the treated soya beans, i. e., those portions adjacent the outer surfaces of the beans and consequently, said contracted cellular structures will be sealed against the further admitting of appreciable quantities of the heated kettle contained oil. This prevents distortion of the highly desirable nut-like flavor of the beans, and also, it effects a considerable economy in the usage of oil. And more important, the first stage of oil treatment of the soya beans effects a positive sealing of the taste converted natural oils and other substances of the treated soya beans within the contracted cellular structures, hence, absolutely excluding the admission of air thereinto and by consequence, preserving such natural oils and other matters against rancidity. By means of the second stage of oil treatment of the soya beans, a substantially nut-like consistency or tooth resistance is imparted thereto; also, the aforesaid nut-like flavor is attained by the bean.

I am aware of various methods or processes heretofore practiced in connection with the treatment of soya beans for rendering the same edible, wherein the soya beans are soaked in water or alkali solutions or subjected to the moistening action of steam for comparatively long periods of time—say from ten to fifteen hours, and thereafter, are treated or cooked in oil. Such methods or processes of treatment, however, effect a maximum enlargement of the beans and consequently, a maximum dilation or expansion of their cellular structures. By reason of this character of enlargement and expansion of the cellular structures of the beans, the albuminous substances or biological properties thereof are either dissipated, destroyed or greatly injured, with the result that not only are the nutritive properties of the treated soya beans greatly lessened, but also, that it becomes impossible to attain in beans so treated, the highly desirable qualities of flavor which are found in soya beans treated in accordance with my invention. I have also found in actual and exhaustive processes of experimentation that excessive soaking of the soya beans, or soaking of the same until their maximum enlargement is effected, causes the beans to acquire a most objectionable cereal-like taste which cannot be overcome or converted in subsequent oil cooking or treatment thereof, this being probably due to a thorough dispersion or impregnation of the bean bodies or meats with the oils and other objectionable properties of taste thereof brought about by the prolonged water soaking. Furthermore, prolonged water soaking of soya beans, with a resultant maximum dilation or expansion, prevents the cellular structures of the beans from being contracted or the beans from being returned to their normal sizes when they are subsequently cooked or treated in the heated oil. Thus, the finished products of the above referred to methods or processes are of sizes much larger than the normal or original sizes of the soya beans. As the result of this condition, air will be admitted to the fixedly expanded cellular structures of the soya beans and upon contacting with the residual oils or other matters therein contained will cause the beans to rapidly become rancid and unfit for consumption. It is also of moment to note that where treated soya beans are enlarged and fixed in their enlarged sizes by an oil treating or cooking, as is done in the heretofore prevalent methods or processes, their body consistencies are ineffectually resistant, and hence, exceedingly fragile. Consequently, in subsequent handling and/or packaging of the beans, they are easily broken and even granulated, and thereby rendered substantially unfit as a commercial product, as well as highly undesirable for consumption.

In hereinbefore describing the first stage of oil treatment of the soya beans, it will be recalled that the oil in which the beans are submerged is heated from 350° F. to 375° F. Of course, this temperature may vary between these points.

Also, it is to be understood that, if desired, the temperature of the oil used in the first stage of treatment may be brought to an even higher degree, provided that the character of the oil used is such that said oil will not be burned or scorched, and by consequence, impart a most undesirable flavor to the beans treated thereby. In other words, the effecting of a rapid treatment of the beans in this first stage, is most important, and if the oil can be heated to a degree above 375° F. without injury thereto, then so much more rapid can the first stage of treatment of the soya beans be effected.

Whereas soya beans treated in accordance with the herein described process require no additional flavoring matter, it is, of course, to be understood that the product, if desired, may be salted to taste, by methods well known in the art.

I claim:

1. A process for preparing soya beans, which consists of imparting a limited quantity of water content to the soya beans and thereby expanding their cellular structures without destroying their inherent elasticity, submerging said beans in oil at a temperature of approximately 375° F., and causing said moisture content to be forced into and through their cellular structures, converted into steam and exploded therein, continuing said application of heat from the oil to the beans and contracting the expanded cellular structures, and then decreasing the temperature of said oil to approximately 275° F., until the beans acquire a substantially nut-like consistency.

2. A process for preparing soya beans, which consists of soaking the beans in water for a time up to two hours to saturate the skins thereof and to impart to the bodies of the beans a pronounced though limited water content, whereby to partially expand the cellular structures of the beans, then submerging said beans in highly heated oil whereby said moisture content will be rapidly forced into and through said cellular structures, converted into steam and exploded therein; continuing the application of heat to the beans from said oil during which said cellular structures will be contracted, and then reducing the temperature of said oil to a degree sufficient for cooking the beans whereby to impart a nut-like body consistency and the desired color thereto.

3. A process for preparing soya beans and like legumes, which consists of imparting a superficial but surface-penetrating moisture to the beans by soaking the same for a period of time up to two hours, submerging such beans in oil heated to a degree sufficient to cause said moisture to move into and through the cellular structures of the beans in the form of steam, the pressure of the steam in some of said cellular structures being sufficient to explode the same; continuing the application of heat from the oil to the beans following dissipation of the steam in their cellular structures during which the cellular structures will be contracted and sealed, and then reducing the temperature of the oil to a degree sufficient and for a period of time of such duration as to impart a nut-like consistency and the desired color to the beans.

4. A process for treating soya beans and like legumes, which consists of imparting a limited and superficial, but hull penetrating and bean meat penetrating moisture to the beans whereby to cause the same to be expanded to a degree well within the limits of the maximum expansibility of the bean meat cellular structures, submerging such beans in oil heated to a degree sufficient to cause the moisture to move into and through the cellular structures of the beans in the form of steam, the pressure of the steam in some of the cellular structures being sufficient to explode the same; continuing the application of heat from said oil to the beans following dissipation of the steam in their cellular structures, during which period of time the partially expanded cellular structures, because of their inherent elasticity, will be contracted and sealed at the surfaces of the bean meats, and then reducing the temperature of the oil to a degree and for a time sufficient to impart a nut-like consistency and the desired color to the beans.

5. A process for treating soya beans or like legumes which consists of expanding the cellular structures of the beans by subjecting them to moisture, but at all times during such expanding, maintaining the inherent elasticity of the bean cellular structures whereby the same will remain capable of contraction, submerging the expanded beans in oil preheated to a degree sufficient to cause the moisture within the expanded bean cellular structures to be converted into steam and to move through the same, continuing for a time the application of heat from the oil to the beans following dissipation of the steam in their expanded cellular structures and allowing such expanded cellular structures to contract and to be sealed at the surfaces of the bean meats and then reducing the temperature of the oil to a degree and for a time sufficient to impart a nut-like consistency and the desired color to the beans.

ALFRED H. McCOMB.